(12) United States Patent
Takahashi et al.

(10) Patent No.: US 6,338,382 B1
(45) Date of Patent: Jan. 15, 2002

(54) AIR CONDITIONER

(75) Inventors: Tomomi Takahashi; Shinji Sugiyama; Ritsushi Taira; Shunsuke Nakashima; Makoto Yanagida, all of Kawasaki (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 09/639,885

(22) Filed: Aug. 17, 2000

(30) Foreign Application Priority Data

Aug. 25, 1999  (JP) .......................................... 11-238133
Aug. 25, 1999  (JP) .......................................... 11-238134

(51) Int. Cl.$^7$ ................................................ F28F 27/00
(52) U.S. Cl. ............................ 165/96; 165/119; 62/317
(58) Field of Search .............................. 65/95, 96, 119, 65/124, 303; 62/303, 317

(56) References Cited

U.S. PATENT DOCUMENTS

| | | | | |
|---|---|---|---|---|
| 4,562,955 A | * | 1/1986 | Horster et al. .............. 237/2 B |
| 5,290,343 A | * | 3/1994 | Morita et al. .................. 96/39 |
| 6,164,082 A | * | 12/2000 | Okamoto et al. ............. 62/317 |
| 6,178,765 B1 | * | 1/2001 | Hironaka et al. ............. 62/303 |
| 6,244,954 B1 | * | 6/2001 | Hosokawa et al. ......... 454/315 |

FOREIGN PATENT DOCUMENTS

| | | | | |
|---|---|---|---|---|
| JP | 57-187047 A | * | 11/1982 | |
| JP | 11-094339 A | * | 9/1997 | ........... F24F/11/02 |

* cited by examiner

Primary Examiner—Allen Flanigan
(74) Attorney, Agent, or Firm—Kanesaka & Takeuchi (57) ABSTRACT

In an air conditioner equipped with an air cleaner, a front panel is provided with three air inlets: a first air inlet located on the front face of the front panel, a second air inlet located on the top face thereof, and a third air inlet located therebetween. Each of the first and second air inlets has an opening/closing unit including louvers, and an air cleaner is arranged on the inside of the third air inlet. At the time of cooling/heating operation and at the time of dehumidifying operation, the first and second air inlets are opened and closed by the opening/closing unit, by which the amount of air passing through the air cleaner is changed, thereby utilizing the air cleaner effectively.

12 Claims, 6 Drawing Sheets

AIR CONDITIONER

TECHNICAL FIELD

The present invention relates to a wall mounted air conditioner used by being mounted on a wall surface of a room and, more particularly, to an air conditioner equipped with an air cleaner.

BACKGROUND ART

In many cases, air conditioners are operated in a closed room, so that dust, smoke of tobacco, soot, odor, and other substances circulate in the room by being carried on an airflow sent from the air conditioner, which sometimes produces an uncomfortable feeling or provides an unhealthy environment.

Although an air filter formed of a woven cloth, fine mesh, or the like is provided in an air inlet of the air conditioner, the air filter of this type cannot remove fine and invisible substances such as smoke of tobacco, soot and odor.

In recent years, therefore, air conditioners equipped with an electrostatic precipitator have been proposed. An example of such an air conditioner will be described with reference to FIG. 6. This air conditioner 1 basically includes a base plate 2 fixed on a wall surface inside a room with, for example, screws, and a front panel 3 held by the base plate 2. The front panel 3 comprises a housing whose back face is open, and the back face side thereof is fixed to the base plate 2.

Figure 6:
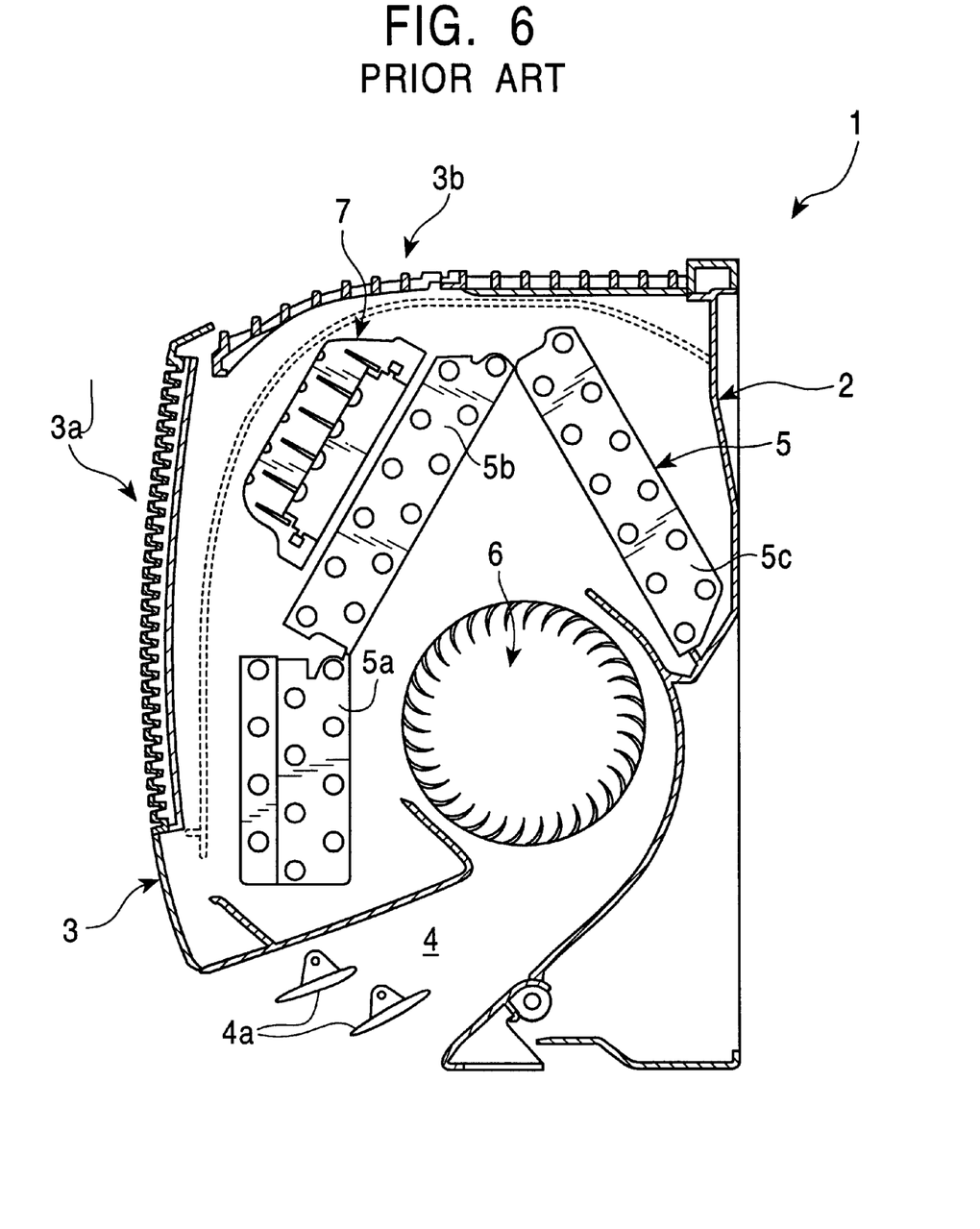
FIG. 6 is a sectional view of an air conditioner of a related prior art.

The front panel 3 has a first air inlet 3a formed on the front face thereof, and a second air inlet 3b formed on the top face facing the ceiling surface of the room. Also, an air outlet 4 is formed on the lower side of the front face of the front panel 3, and flaps 4a for regulating the direction of a wind are provided in the air outlet 4 so as to be turnable.

In an air passage in the front panel 3 ranging from the air inlets 3a and 3b to the air outlet 4 are provided a heat exchanger 5 and a fan 6.

In this case, the heat exchanger 5 is divided into a first heat exchanger 5a arranged substantially vertically along the first air inlet 3a, a second heat exchanger 5b arranged adjacently to the upper end of the first heat exchanger 5a so as to be inclined at a predetermined angle toward the back face side of the front panel 3, and a third heat exchanger 5c arranged adjacently to the upper end of the second heat exchanger 5b so as to extend downward slantwise along the base plate 2. Refrigerant pipes for these heat exchangers 5a, 5b and 5c communicate with each other.

An electrostatic precipitator 7 is provided at a portion having an enough space above the second heat exchanger 5b.

According to this air conditioner 1, some of the air sucked through the air inlets 3a and 3b by the operation of the fan 6 passes through the electrostatic precipitator 7, by which the air in the room is cleaned.

However, for example, even if the air in the room is contaminated heavily and it is to be desired that air cleaning operation be performed in preference to cooling/heating operation and dehumidifying operation, only some of the sucked air passes through an air cleaner 7, which leads to a decrease in a total dust collecting efficiency.

SUMMARY OF THE INVENTION

According to the present invention, at least cooling/heating operation and air cleaning operation can be changed over appropriately, and especially air cleaning operation can be performed effectively.

Also, according to the present invention, even at the time of air cleaning operation, a fan can be operated without any surging phenomenon taking place.

Specifically, a first mode of the invention provides an air conditioner comprising: a base plate fixed to a wall surface inside a room; a front panel comprising a housing whose back face is open, the back face side of which is held by the base plate; the front panel being provided with a first air inlet formed on the front face side facing the back face, a second air inlet formed on the top face side of the front panel, a third air inlet formed between the first and second air inlets, and an air outlet formed on the lower side of the front face of the front panel; said front panel being provided inside thereof with heat exchange means having a first heat exchanger facing the first air inlet, a second heat exchanger facing the second air inlet, a third heat exchanger facing the third air inlet, and a fan arranged in an air passage ranging from the heat exchange means to the air outlet; the first air inlet being provided with first opening/closing means which is opened and closed by first driving means, and the second air inlet being provided with second opening/closing means which is opened and closed by second driving means, and an electrostatic precipitator being disposed between the third air inlet and the third heat exchanger; wherein according to the operation mode of the air conditioner, the first and second opening/closing means are controlled as described below.

At the time of cooling/heating operation, both of the first and second air inlets are "fully opened" by the first and second opening/closing means, respectively.

At the time of cooling/heating operation when air cleaning operation is performed preferentially, both of the first and second air inlets are "half opened" by the first and second opening/closing means, respectively. The word "half opened" means a state between the fully opened state and the fully closed state.

At the time of air cleaning operation, both of the first and second air inlets are "fully closed" by the first and second opening/closing means, respectively.

Also, the first mode of the invention is characterized in that at the time of dehumidifying operation, either one of the first and second opening/closing means is "fully closed," and the other thereof is "fully opened."

In the first mode of the invention, the heat exchangers of the heat exchange means are preferably arranged in a Λ (lambda) shape. That is, it is preferable that the first heat exchanger be arranged substantially vertically along the first air inlet, the second heat exchanger be arranged adjacently to the upper end of the first heat exchanger so as to be inclined at a predetermined angle toward the back face side of the front panel, and the third heat exchanger be arranged adjacently to the upper end of the second heat exchanger so as to extend downward slantwise along the base plate.

In case of this Λ-shaped arrangement, at the time of dehumidifying operation, the first air inlet is "fully closed," and contrarily the second air inlet is "fully opened."

The first mode of the invention embraces several preferable modes and equivalent techniques described below.

Preferably, the first opening/closing means comprises a plurality of first louvers pivotally supported in the first air inlet so as to be turnable with the axis of rotation being horizontal, and a first slide plate driven along the first air inlet in a reciprocating manner by the first driving means, and on the back face of each of the first louvers is provided a first connecting arm connected to the first slide plate, by which the first louvers are turned synchronously by the first slide plate.

Likewise, preferably, the second opening/closing means comprises a plurality of second louvers pivotally supported in the second air inlet so as to be turnable with the axis of rotation being horizontal, and a second slide plate driven along the second air inlet in a reciprocating manner by the second driving means, and on the back face of each of the second louvers is provided a second connecting arm connected to the second slide plate, by which the second louvers are turned synchronously by the second slide plate.

Also, the connecting arm may be provided on the side of the first and second slide plates to synchronously turn the louvers.

Preferably, the first driving means comprises a first cam engaged with the first slide plate and a first motor for driving the first cam, and the second driving means comprises a second cam engaged with the second slide plate and a second motor for driving the second cam.

As the first and second motors, a stepping motor, which can control the rotational angle with high accuracy, is preferably used.

In place of the combination of the cam and motor, the first driving means may be formed of a first plunger provided with a first connecting element connected to the first slide plate, and the second driving means may be formed of a second plunger provided with a second connecting element connected to the second slide plate. In this case, the first and second connecting elements are preferably formed of an elastic material.

A second mode of the invention is characterized by having the constituent features described below in addition to the above-described constituent features of the first mode of the invention.

That is, a wind direction guider for changing the opening area of the air outlet is provided on the lower side of the air outlet so as to be turnable, and at the time of air cleaning operation, both of the first and second air inlets are "fully closed" by the first and second opening/closing means, respectively, and the wind direction guider is turned so as to decrease the opening area of the air outlet.

At the time of cooling/heating operation, both of the first and second air inlets are "fully opened" by the first and second opening/closing means, respectively, and the wind direction guider is turned so as to increase the opening area of the air outlet.

Also, at the time of cooling/heating operation when air cleaning operation is performed preferentially, both of the first and second air inlets are "half opened" by the first and second opening/closing means, respectively, and the wind direction guider is turned so as to increase the opening area of the air outlet.

At the time of dehumidifying operation, either one of the first and second opening/closing means is "fully closed," and the other thereof is "fully opened," and the wind direction guider is turned so as to decrease the opening area of the air outlet.

As driving means for the wind direction guider, a stepping motor is preferably used.

DETAILED DESCRIPTION

Figure 1A:
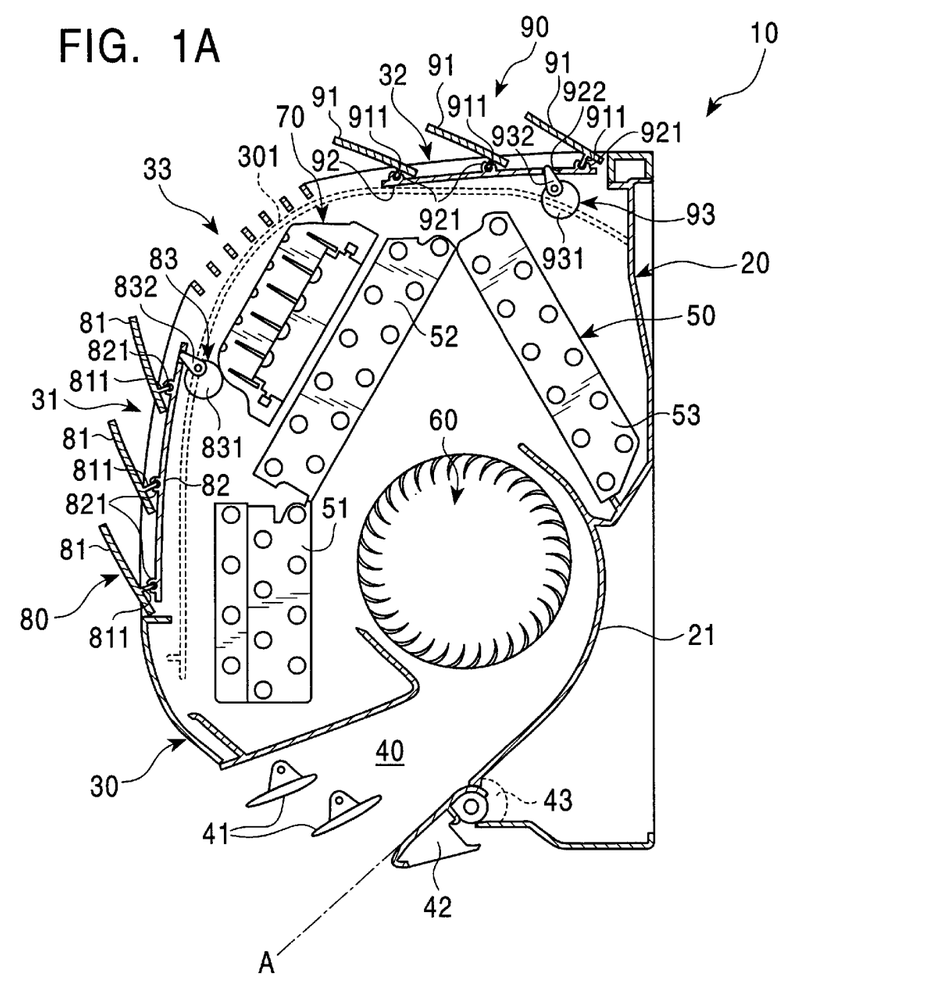
FIG. 1A is a sectional view of an air conditioner in accordance with the present invention, showing a state in which the air conditioner is performing cooling/heating operation.

Referring to a sectional view of FIG. 1A, an air conditioner 10 in accordance with the present invention includes a base plate 20 fixed on a wall surface inside a room with, for example, screws, and a front panel 30 held by the base plate 20. The front panel 30 comprises a housing whose back face is open, and the back face side thereof is fixed to the base plate 20.

The front panel 30 has, in addition to a first air inlet 31 formed on the front face thereof, and a second air inlet 32 formed on the top face facing the ceiling surface of the room, a third air inlet 33 formed between the first and second air inlets 31 and 32, that is, at the upper corner portion of the front panel 30. Inside these air inlets 31 to 33 is provided an air filter 301 formed of a woven cloth or fine mesh as indicated by the chain line in FIG. 1A.

Also, an air outlet 40 is formed on the lower side of the front face of the front panel 30, and flaps 41 for regulating the direction of a wind are provided in the air outlet 40 so as to be turnable.

In an air passage in the front panel 30 ranging from the air inlets 31, 32 and 33 to the air outlet 40 are provided a heat exchanger 50 and a fan 60. A cross flow fan is used as the fan 60.

The heat exchanger 50 is divided into three heat exchangers 51 to 53 arranged in a Λ shape. Specifically, a first heat exchanger 51 is arranged substantially vertically along the first air inlet 31. A second heat exchanger 52 is arranged adjacently to the upper end of the first heat exchanger 51 so as to be inclined at a predetermined angle toward the back face side of the front panel 30 to face the third air inlet 33. A third heat exchanger 53 is arranged adjacently to the upper end of the second heat exchanger 52 so as to extend downward slantwise along the base plate 20.

Refrigerant pipes for these heat exchangers 51 to 53 communicate with each other. Also, the heat exchanger 50 and the fan 60 are supported on the base plate 20 via a support member, not shown.

Above the second heat exchanger 52 is provided an electrostatic precipitator 70 so as to face the third air inlet 33. This electrostatic precipitator 70 may be the same as the electrostatic precipitator 7 used in the related art described before.

The first air inlet 31 on the front face is provided with first opening/closing means 80, and the second air inlet 32 on the top face is also provided with second opening/closing means 90. Contrarily, the third air inlet 33 disposed between these air inlets has no opening/closing means and is always open.

The first opening/closing means 80 has a plurality of (three in this example) first louvers 81 pivotally supported in the first air inlet 31 so as to be turnable with the axis of rotation being horizontal, and a first slide plate 82 slidable vertically along the inside face of the first air inlet 31.

On the back face side of each of the first louvers 81 is provided a first connecting arm 811. The first slide plate 82 is formed with engagement grooves 821 for rotatably accommodating the tip ends of the first connecting arms 811.

The first slide plate 82 is connected with first driving means 83. In this embodiment, the first driving means 83 includes a motor 831 and a first cam 832 installed to the output shaft thereof, and the tip end portion of the first cam 832 engages with an engagement hole 822 formed in the first slide plate 82 (see FIG. 1B). The motor 831 is supported by a support member, not shown, so that the output shaft thereof is in parallel with the first air inlet 31 and horizontal.

Figure 1B:
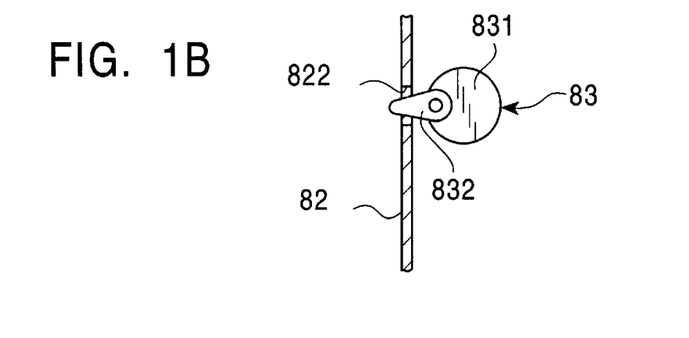
FIG. 1B is an enlarged sectional view of an essential part of the air conditioner shown in FIG. 1A, showing a state in which a first slide plate and a first driving means shown in FIG. 1A are connected each other.

Therefore, the rotational motion of the motor 831 is converted into vertical motion by the first cam 832 and the engagement hole 822 and is transmitted to the first slide plate 82. Accordingly, the first louvers 81 are turned synchronously between the "full open" position and the "full closed" position of the first air inlet 31. The motor 831 may be a d.c. motor, for example, but a stepping motor, which can control the rotational angle with high accuracy, is preferably used.

Although the upper end side of the first louver 81 is opened or closed in this embodiment, the lower end side thereof may be opened or closed. Also, the first connecting arm 811 may be provided on the side of the first slide plate 82 to turn the first louver 81.

The second opening/closing means 90 also has the same construction as that of the first opening/closing means 80. Specifically, the second opening/closing means 90 has a plurality of (three in this example) second louvers 91 pivotally supported in the second air inlet 32 so as to be turnable with the axis of rotation being horizontal, and a second slide plate 92 slidable longitudinally (horizontally) along the inside face of the second air inlet 32.

On the back face side of each of the second louvers 91 is provided a second connecting arm 911. The first slide plate 92 is formed with engagement grooves 921 for rotatably accommodating the tip ends of the second connecting arms 911.

The second slide plate 92 is connected with second driving means 93. Like the aforementioned first driving means 83, the second driving means 93 also includes a motor 931 and a second cam 932 installed to the output shaft thereof, and the tip end portion of the second cam 932 engages with an engagement hole 922 formed in the second slide plate 92. The motor 931 is supported by a support member, not shown, so that the output shaft thereof is in parallel with the second air inlet 32 and horizontal.

Therefore, the rotational motion of the motor 931 is converted into longitudinal (horizontal) motion by the second cam 932 and the engagement hole 922 and is transmitted to the second slide plate 92. Accordingly, the second louvers 91 are turned synchronously between the "full open" position and the "full closed" position of the second air inlet 32. The motor 931 may also preferably be a stepping motor, which can control the rotational angle with high accuracy.

According to this embodiment, a rear guider 21 forming the back face side of an air passage for the fan 60 is provided on the side of the base plate 20, and a wind direction guider 42, which is located on the extension of the rear guider 21 to change the opening area of the air outlet 40, is provided on the lower side of the air outlet 40 so as to be turnable. In this embodiment, the turning position of the wind direction guider 42 indicated in FIG. 1A, that is, the position A included on the extension of the rear guide 21 is the maximum opening position of the wind direction guider 42.

A motor 43 for turning the wind direction guider 42 is provided on the side of the base plate 20. This motor 43 and the aforementioned motors 831 and 931 are controlled appropriately according to the operation mode of the air conditioner 10 by control means comprising, for example, a microcomputer, not shown.

The following is a description of the operation of the air conditioner 10 in each operation mode. First, when a command for cooling or heating operation is given to the air conditioner 10 by means of a remote controller, the control means gives a full open signal to the motors 831, 931 and 43. Thereby, as shown in FIG. 1A, all of the first louvers 81, second louvers 91, and wind direction guider 42 are fully opened.

Thereupon, because of a decreased suction resistance of air, the air in the room is sucked efficiently through all of the air inlets 31 to 33, and is delivered through the air outlet 40 after passing through each of the heat exchangers 51 to 53. Therefore, the load of the fan 60 is reduced, so that cooling/heating operation and air cleaning operation can be performed efficiently with a low consumption of power.

Figure 2:
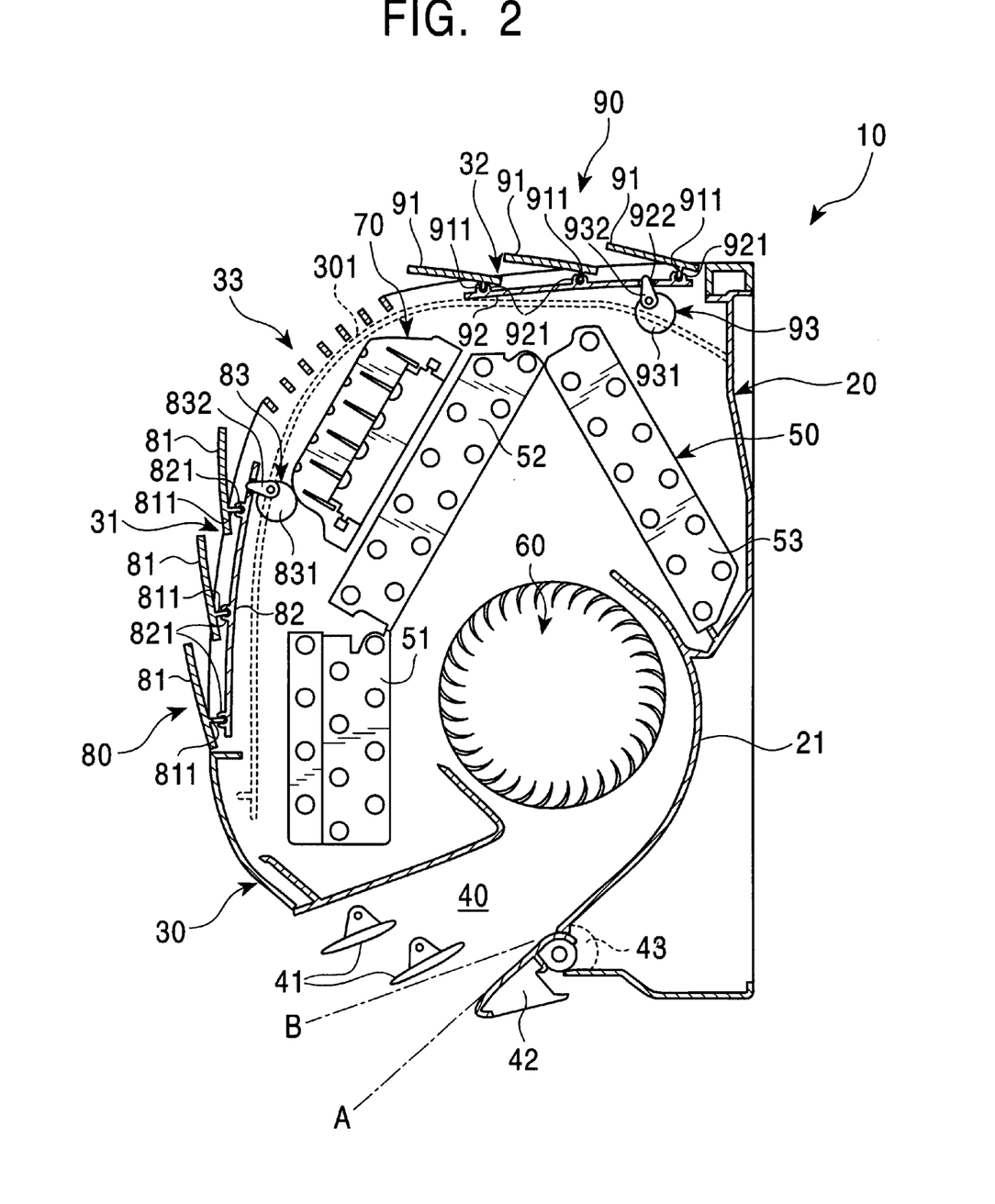
FIG. 2 is a sectional view of an air conditioner in accordance with the present invention, showing a state in which the air conditioner is performing air cleaning operation in preference to cooling/heating operation.

When air cleaning operation is performed in preference to cooling/heating operation, that is, when it is to be desired that air cleaning operation be performed preferentially at the time of cooling/heating operation, the first and second louvers 81 and 91 are half opened as shown in FIG. 2. The air direction guider 42 is held at the full open position A.

Thereupon, the amount of air sucked through the first and second air inlets 31 and 32 decreases relatively with respect to the amount of air sucked through the third air inlet 33, so that the amount of air passing through the air cleaner 70 increases, resulting in an increase in the dust collecting efficiency.

Figure 3:
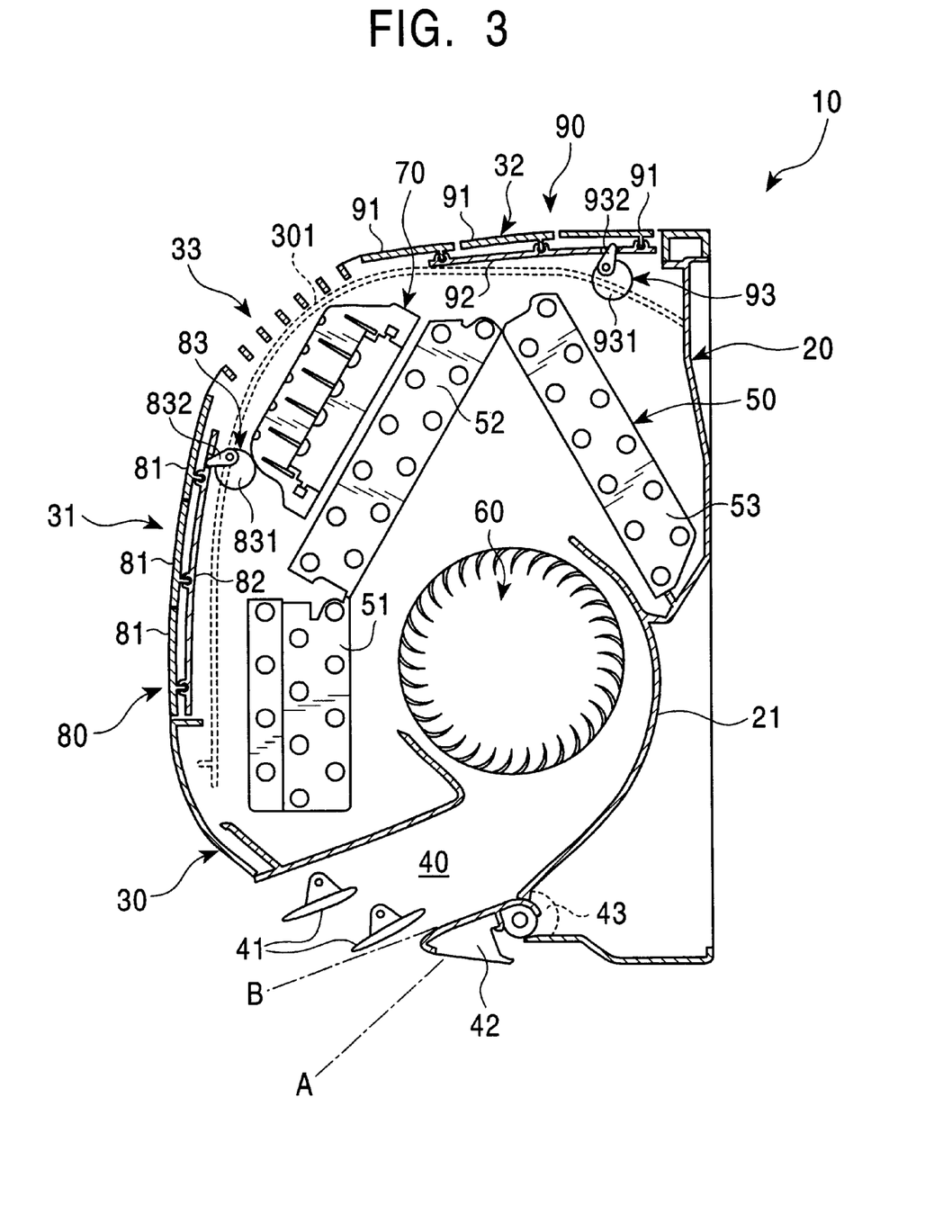
FIG. 3 is a sectional view of an air conditioner in accordance with the present invention, showing a state in which the air conditioner is performing air cleaning operation.

At the time of air cleaning operation, the first and second louvers 81 and 91 are closed fully as shown in FIG. 3.

Thereupon, the air in the room is not sucked through the first and second air inlets 31 and 32 but is sucked through the third air inlet 33, so that almost all of the sucked air passes through the air cleaner 70, resulting in a further increase in the dust collecting efficiency.

At the time of air cleaning operation, the heat exchanger 50 can be turned on or off arbitrarily. When the heat exchanger 50 is turned on, the second heat exchanger 52 contributes to heat exchange.

At the time of air cleaning operation, the first and second air inlets 31 and 32 are closed fully and the air is sucked through the third air inlet 33 only, so that the suction resistance of air increases. In this case, if dust or the like sticks to the third air inlet 33, the suction resistance of air increases further.

Thereby, a negative pressure is created in the fan 60, so that a surging phenomenon may take place. That is to say, the pressure in the air passage becomes unstable, and the air flows backward from the side of the air outlet 40, whereby noise may be produced accordingly.

In such a case, the wind direction guider 42 can be turned from the full open position A to the position B where the opening area of the air outlet 40 decreases as shown in FIG. 3. By doing this, the pressure on the side of the air outlet 40 is increased, so that the surging phenomenon is prevented.

Figure 4:
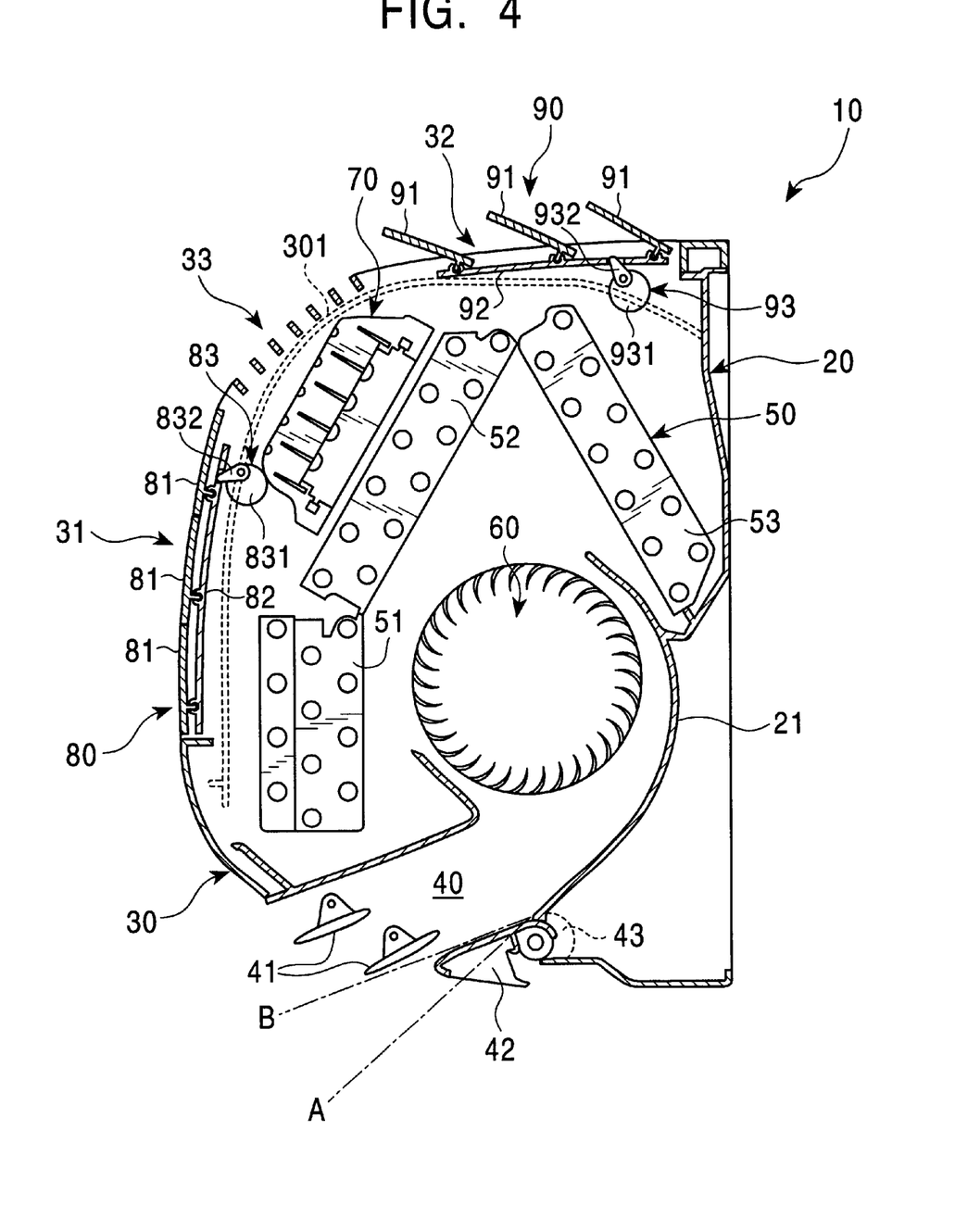
FIG. 4 is a sectional view of an air conditioner in accordance with the present invention, showing a state in which the air conditioner is performing dehumidifying operation.

At the time of dehumidifying operation, the first louvers 81 are closed fully, and the second louvers 91 are opened fully as shown in FIG. 4.

Thereupon, the air sucked through the second and third air inlets 32 and 33 passes mainly through the second and third heat exchangers 52 and 53 slowly, whereby the dehumidifying efficiency is increased.

At the time of dehumidifying operation, if there is a fear of the surging phenomenon taking place, like the time of air cleaning operation, the wind direction guider 42 can be turned from the full open position A to the position B where the opening area of the air outlet 40 decreases.

Figure 5:
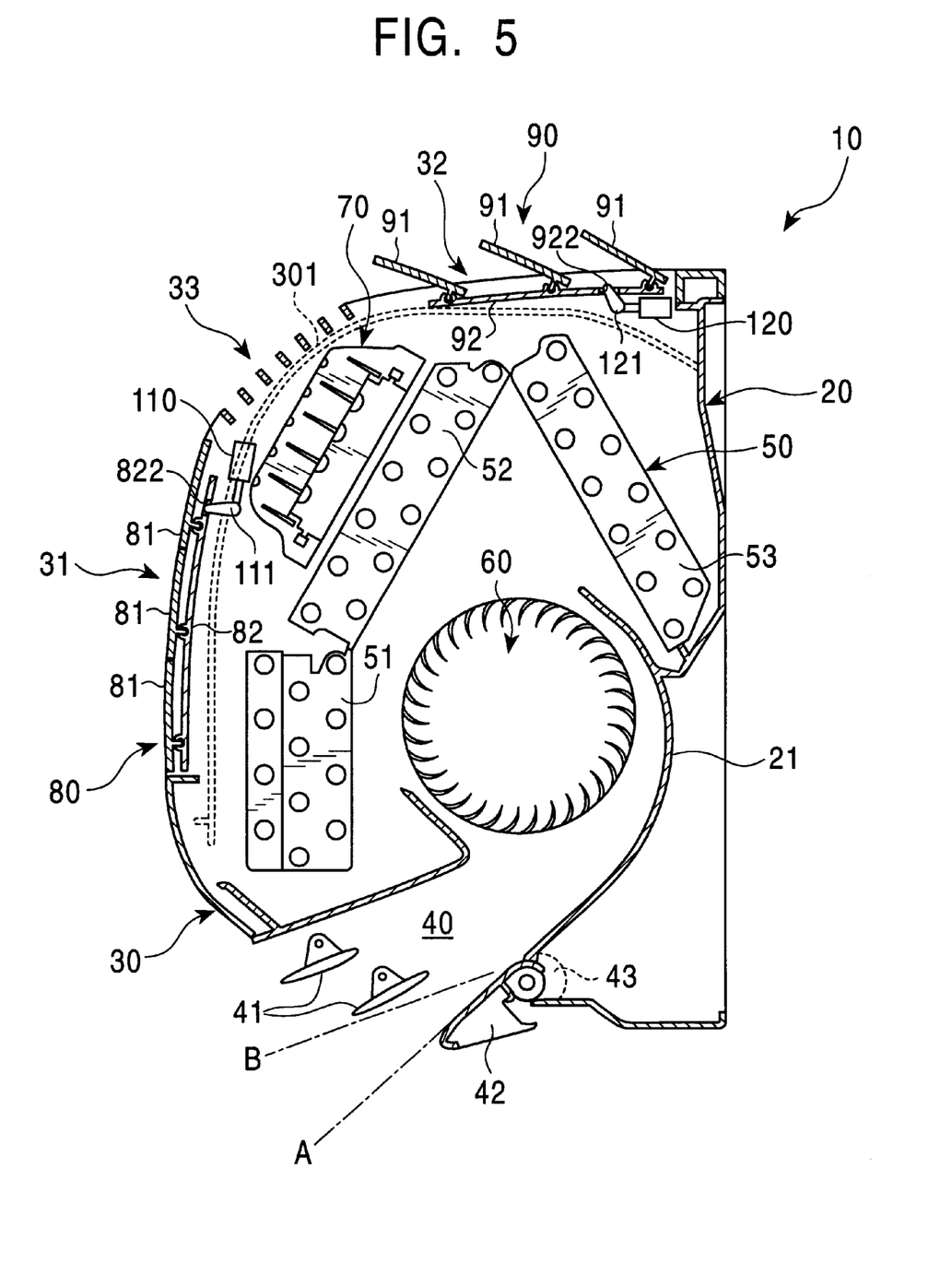
FIG. 5 is a sectional view showing a modification of an air conditioner in accordance with the present invention.

The following is a description of a modification shown in FIG. 5. In the above-described embodiment, the motors 831 and 931 are used as driving means for the first and second slide plates 82 and 92, respectively. In this modification, however, the first slide plate 82 is driven by a first plunger 110, and the second slide plate 92 is driven by a second plunger 120. The plunger 110, 120 can be formed of a solenoid, for example.

The first plunger 110 is provided with a first connecting element 111 which is engaged with the engagement hole 822 in the first slide plate 82, and the advancing and retreating motion of the element 111 drives the first slide plate 82 vertically in a reciprocating manner.

Similarly, the second plunger 120 is also provided with a second connecting element 121 which is engaged with the engagement hole 922 of the second slide plate 92, and the advancing and retreating motion of the element 121 drives the second slide plate 92 vertically in a reciprocating manner.

In this case, the first and second connecting elements 111 and 121 can be formed of an elastic material such as rubber to ease the shock peculiar to the plunger. As an alternative, a cushioning member formed of, for example, a spring material may be interposed between the first connecting element 111 and the first slide plate 82 and between the second connecting element 121 and the second slide plate 92 to ease the shock.

The above is a detailed description of one embodiment of the present invention, and the present invention is not limited to the above-described embodiment. All changes and equivalent techniques that can be adopted easily without departing from the spirit and scope of the present invention are embraced by the present invention.

What is claimed is:

1. An air conditioner, comprising:
   a base plate fixed to a wall surface inside a room;
   a front panel comprising a housing whose back face is open, the back face side of which is held by said base plate;
   said front panel being provided with a first air inlet formed on the front face side facing said back face, a second air inlet formed on the top face side of said front panel, a third air inlet formed between said first and second air inlets, and an air outlet formed on the lower side of the front face of said front panel;
   said front panel being provided inside thereof with heat exchange means having a first heat exchanger facing said first air inlet, a second heat exchanger facing said second air inlet, a third heat exchanger facing said third air inlet, and a fan arranged in an air passage ranging from said heat exchange means to said air outlet;
   said first air inlet being provided with first opening/closing means which is opened and closed by first driving means, said second air inlet being provided with second opening/closing means which is opened and closed by second driving means, and an electrostatic precipitator being disposed between said third air inlet and said third heat exchanger,
   characterized in that at the time of cooling/heating operation, both of said first and second air inlets are "fully opened" by said first and second opening/closing means, respectively;
   at the time of cooling/heating operation when air cleaning operation is performed preferentially, both of said first and second air inlets are "half opened" by said first and second opening/closing means, respectively; and
   at the time of air cleaning operation, both of said first and second air inlets are "fully closed" by said first and second opening/closing means, respectively.

2. The air conditioner according to claim 1, characterized in that at the time of dehumidifying operation, either one of said first and second opening/closing means is "fully closed," and the other thereof is "fully opened."

3. The air conditioner according to claim 2, characterized in that in a case where said first heat exchanger is arranged substantially vertically along said first air inlet, said second heat exchanger is arranged adjacently to the upper end of said first heat exchanger so as to be inclined at a predetermined angle toward the back face side of said front panel, and said third heat exchanger is arranged adjacently to the upper end of said second heat exchanger so as to extend downward slantwise along said base plate, said "fully closed" air inlet is said first air inlet, and said "fully opened" air inlet is said second air inlet.

4. The air conditioner according to claim 1, characterized in that said first opening/closing means comprises a plurality of first louvers pivotally supported in said first air inlet so as to be turnable with the axis of rotation being horizontal, and a first slide plate driven along said first air inlet in a reciprocating manner by said first driving means, and on the back face of each of said first louvers is provided a first connecting arm connected to said first slide plate, by which said first louvers are turned synchronously by said first slide plate; and
   said second opening/closing means comprises a plurality of second louvers pivotally supported in said second air inlet so as to be turnable with the axis of rotation being horizontal, and a second slide plate driven along said second air inlet in a reciprocating manner by said second driving means, and on the back face of each of said second louvers is provided a second connecting arm connected to said second slide plate, by which said second louvers are turned synchronously by said second slide plate.

5. The air conditioner according to claim 4, characterized in that said first driving means comprises a first cam engaged with said first slide plate and a first motor for driving said first cam, and said second driving means comprises a second cam engaged with said second slide plate and a second motor for driving said second cam.

6. The air conditioner according to claim 5, characterized in that both of said first and second motors are formed of a stepping motor.

7. The air conditioner according to claim 5, characterized in that said first driving means is formed of a first plunger provided with a first connecting element connected to said first slide plate, and said second driving means is formed of a second plunger provided with a second connecting element connected to said second slide plate.

8. The air conditioner according to claim 7, characterized in that said first and second connecting elements are formed of an elastic material.

9. An air conditioner, comprising:

a base plate fixed to a wall surface inside a room;

a front panel comprising a housing whose back face is open, the back face side of which is held by said base plate;

said front panel being provided with a first air inlet formed on the front face side facing said back face, a second air inlet formed on the top face side of said front panel, a third air inlet formed between said first and second air inlets, and an air outlet formed on the lower side of the front face of said front panel;

said front panel being provided inside thereof with heat exchange means having a first heat exchanger facing said first air inlet, a second heat exchanger facing said second air inlet, a third heat exchanger facing said third air inlet, and a fan arranged in an air passage ranging from said heat exchange means to said air outlet;

said first air inlet being provided with first opening/closing means which is opened and closed by first driving means, said second air inlet being provided with second opening/closing means which is opened and closed by second driving means, and an electrostatic precipitator being disposed between said third air inlet and said third heat exchanger; and a wind direction guider for changing the opening area of said air outlet, which is provided on the lower side of said air outlet so as to be turnable, characterized in that at the time of air cleaning operation, both of said first and second air inlets are "fully closed" by said first and second opening/closing means, respectively, and said wind direction guider is turned so as to decrease the opening area of said air outlet; and at the time of cooling/heating operation, both of said first and second air inlets are "fully opened" by said first and second opening/closing means, respectively, and said wind direction guider is turned so as to increase the opening area of said air outlet.

10. The air conditioner according to claim 9, characterized in that at the time of cooling/heating operation when air cleaning operation is performed preferentially, both of said first and second air inlets are "half opened" by said first and second opening/closing means, respectively, and said wind direction guider is turned so as to increase the opening area of said air outlet.

11. The air conditioner according to claim 9, characterized in that at the time of dehumidifying operation, either one of said first and second opening/closing means is "fully closed," and the other thereof is "fully opened," and said wind direction guider is turned so as to decrease the opening area of said air outlet.

12. The air conditioner according to claim 9, characterized in that driving means for said wind direction guider is formed of a stepping motor.

* * * * *